3,300,535
PRODUCTION OF POLYOXYMETHYLENE GLYCOLS

Harry Yakimik, Jr., and Kenneth T. Sloan, Garfield, N.J., assignors, by mesne assignments, to Tenneco Chemicals Inc., a corporation of Delaware
No Drawing. Filed Mar. 19, 1963, Ser. No. 266,191
5 Claims. (Cl. 260—615.5)

This invention relates to the production of polyoxymethylene glycols which are suitable for depolymerization to gaseous monomeric formaldehyde and, more particularly, to a process for producing low molecular weight polyoxymethylene glycols having a low water content. The invention provides an improved process for producing low molecular weight polyoxymethylene glycols containing not more than 0.1 percent by weight of water, as well as the polymers produced by this process.

High molecular weight polymers of formaldehyde are thermoplastic resins from which many shaped articles, such as films, fibers, filaments, sheets, rods and tubes, can be fabricated. These polymers are usually prepared by the polymerization of anhydrous, gaseous, monomeric formaldehyde in an inert liquid medium in the presence of a polymerization initiator, and the resultant polymer stabilized. The anhydrous, gaseous, monomeric formaldehyde used in the preparation of these high molecular weight polymers is usually obtained by the thermal or catalytic decomposition of various low molecular weight formaldehyde polymers, which decomposition invariably necessitates the subsequent removal of water and other impurities from the resulting gas stream. Among the various low molecular weight formaldehyde polymers that have been suggested for this purpose are trioxane, paraformaldehyde, and $\alpha$-polyoxymethylene, none of which has proven to be entirely satisfactory as a source of anhydrous, gaseous, monomeric formaldehyde. Anhydrous trioxane, the cyclic trimer of formaldehyde, can be depolymerized to yield monomeric formaldehyde, but it is generally costly and difficult to obtain trioxane in the required anhydrous state, while paraformaldehyde is not usually used as a source of monomeric formaldehyde since the commercially available paraformaldehydes contain 4 to 5 percent by weight of water which must be separated from the gas stream prior to the polymerization of the monomeric formaldehyde to high molecular weight polymers. Nor is $\alpha$-polyoxymethylene, which is the low molecular weight formaldehyde polymer most often used as the source of anhydrous monomeric formaldehyde, entirely satisfactory, since this polymer cannot be prepared without containing approximately 0.5 to 3 percent by weight of water, which, in turn, must be removed from the gas stream before the monomeric formaldehyde can be converted to high molecular weight polymers. Removal of water from the depolymerization of $\alpha$-polyoxymethylene is usually accomplished by freezing the water from the gas stream or by deliberately causing this water to react with formaldehyde to form low molecular weight prepolymers which are then removed from the reaction medium. The former method is obviously cumbersome and unsuited to the large-scale production of very pure anhydrous, monomeric formaldehyde while the use of the latter method results in decreased yields of the high molecular weight polymers based on the weight of formaldehyde gas charged into the reaction.

The present invention provides an improved process for producing low molecular weight polyoxymethylene glycols which are suitable for depolymerization to anhydrous, gaseous, monomeric formaldehyde. We have discovered that by adjusting the temperature of an aqueous alkaline solution of formaldehyde to a temperature above the precipitation temperature of paraformaldehyde and then slowly cooling the adjusted solution at a rate of about 3° C. to about 15° C. per hour to a temperature in the range between 20° C. and 30° C., it is possible to selectively crystallize a low molecular weight polyoxymethylene glycol containing not more than 0.1 percent by weight of water. These polyoxymethylene glycols have a molecular weight in the range from about 2,000 to about 6,000 and contain not more than 0.1 percent by weight and, in most instances, less than 0.05 percent by weight of water, thus permitting their use for depolymerization to gaseous, monomeric formaldehyde.

Based on this discovery, the invention provides an improved process for producing a low molecular weight polyoxymethylene glycol suitable for depolymerization to gaseous, monomeric formaldehyde which comprises (i) preparing an aqueous solution containing from about 30 to about 60 percent by weight of formaldehyde and from about 0.001 to about 0.05 mole of alkali per mole of formaldehyde, (ii) adjusting the temperature of the aqueous alkaline solution to a temperature in excess of the precipitation temperature of paraformaldehyde, and (iii) slowly cooling the adjusted solution at a rate of about 3° C. to about 15° C. per hour to a temperature in the range between 20° C. and 30° C., thereby selectively crystallizing a low molecular weight polyoxymethylene glycol containing not more than 0.1 percent by weight of water. The invention further contemplates a polyoxymethylene glycol having an average molecular weight in the range from about 2,000 to about 6,000 and containing not more than 0.1 percent by weight of water.

The aqueous formaldehyde solutions from which the low molecular weight polyoxymethylene glycols of the invention are prepared are solutions that contain from about 30 to about 60 percent by weight and, more preferably, from about 45 to 50 percent by weight, of formaldehyde and that are substantially free of methanol. More concentrated formaldehyde solutions may be used, but there is no particular advantage in employing solutions containing in excess of about 60 percent by weight of formaldehyde.

The aqueous formaldehyde solution is treated with approximately 0.001 mole of approximately 0.05 mole, and preferably with 0.005 mole to 0.02 mole, of alkali per mole of formaldehyde and then adjusted to a temperature above the precipitation temperature of paraformaldehyde to prevent the contamination of the product with paraformaldehyde. The adjusted solution is then cooled slowly and at a uniform rate to room temperature, thereby selectively crystallizing the polyoxymethylene glycol of the invention.

While the alkali with which the aqueous solution of formaldehyde is treated is ordinarily and preferably sodium hydroxide, other strongly alkaline materials can be used for this purpose. These include, for example, the alkali metal and alkaline earth metal hydroxides, oxides, and carbonates, among which are lithium hydroxide, potassium hydroxide, rubidium hydroxide, calcium oxide, magnesium oxide, barium oxide, strontium oxide, sodium carbonate, potassium carbonate, and calcium carbonate. The alkali can be added as a solid to the formaldehyde solution, or it can be added as an aqueous solution containing approximately 20 to 70 percent by weight of alkali.

Addition of the alkali to the formaldehyde solution may be made at room temperature and the resultant alkaline solution heated to a temperature above the precipitation temperature of paraformaldehyde, or, alternatively, the alkali may be added to a hot solution of formaldehyde which is at a temperature in excess of the precipitation temperature of paraformaldehyde.

The alkali-treated formaldehyde solution should be adjusted to a temperature above the depolymerization temperature of paraformaldehyde to prevent the contamination of the polymeric product with paraformaldehyde. This temperature is dependent to some extent upon the concentration of formaldehyde in the solution, with higher temperatures being employed with higher concentrations of formaldehyde, and is generally in the range between about 50° C. and about 100° C. When solutions containing from about 45 to about 55 percent by weight of formaldehyde are used, the preferred temperature range is between about 55° C. and about 65° C.

The hot alkali-treated aqueous formaldehyde solution is then cooled slowly and at a uniform rate to a temperature in the range from 20° C. to 30° C. to yield the polyoxymethylene glycols having the desired properties. Particularly satisfactory results have been obtained when the adjusted solution is cooled at the rate of approximately 3° C. to approximately 15° C. per hour. When the adjusted solution is slowly cooled at a rate of approximately 6° C. to approximately 10° C. per hour, a high yield is obtained of polyoxymethylene glycols containing less than 0.05 percent by weight of water. When the solution is at a temperature appreciably above the depolymerization temperature of paraformaldehyde, the solution may be cooled rapidly to approximately about 55° C. to 65° C., and then slowly cooled at the aforementioned rate to room temperature (i.e., 20° C. to 30° C.) to selectively crystallize the polyoxymethylene glycols containing not more than 0.1 percent by weight of water.

To obtain efficient heat transfer, the formaldehyde solution should be agitated throughout the cooling period. It is then generally agitated at a temperature in the range between 20° C. and 30° C. for a period of about 4 hours to about 24 hours to provide the maximum yield of precipitated polymer. The precipitated polyoxymethylene glycol is then separated from the aqueous solution by filtration or other known procedures, washed with water to remove any residual alkali, and dried.

Polyoxymethylene glycols prepared in accordance with the process of the invention have an average molecular weight in the range of about 2,000 to about 6,000, and contain less than 0.1 percent and, in most cases, less than 0.05 percent by weight of water. These polyoxymethylene glycols can be depolymerized to yield gaseous, monomeric formaldehyde from which the small amounts of water and other impurities that are present can be readily removed. The resulting anhydrous, gaseous, monomeric formaldehyde may then be employed in the preparation of high molecular weight polymers of formaldehyde which, after stabilization, may be molded, extruded, or otherwise fabricated into various useful articles.

The following examples are illustrative of the ease with which low molecular weight polyoxymethylene glycols containing not more than 0.1 percent by weight of water may be prepared in accordance with the process of the invention:

*Example I*

To 2440 parts by weight of 46 percent methanol-free aqueous formaldehyde solution which had been heated to 60° C. was added 30 parts by weight of 50 percent aqueous sodium hydroxide solution (1 mole percent based on the formaldehyde) over a 30-minute period. Throughout the addition, the formaldehyde solution was agitated vigorously, and its temperature was maintained at 60° C. The reaction mixture was then cooled at the rate of 6°–7° C. per hour to 20° C. The mixture was agitated during the cooling period and then at 20° C. for 18 hours.

The reaction mixture was filtered in a centrifuge. The solid polymer that was collected was washed with water until the pH of the wash water was 6.0, and then dried at 40° C. under vacuum. There was obtained 744 parts by weight of polyoxymethylene glycol, which indicates that 66 percent by weight of the formaldehyde had been converted to the low molecular weight formaldehyde polymer. The product had an average molecular weight of approximately 2,000 and contained 0.02 percent by weight of water.

*Example II*

To 702 parts by weight of 45.5 percent methanol-free aqueous formaldehyde solution which had been heated to 60° C. was added 8.6 parts by weight of 50 percent aqueous sodium hydroxide solution (1 mole percent based on the formaldehyde) over a period of 30 minutes. Throughout the addition, the formaldehyde solution was agitated vigorously, and its temperature was maintained at 60° C. The reaction mixture was then cooled at the rate of 7° C. to 20° C. The reaction mixture was agitated during the cooling period and then at 20° C. for 18 hours.

The reaction mixture was filtered. The solid polymer that was collected was washed with water until the pH of the wash water was 6.0, and then dried at 40° C. under vacuum. There was obtained 228.5 parts by weight (71.3 percent conversion) of polyoxymethylene glycol which contained less than 0.02 percent by weight of water.

*Example III*

To 1492 parts by weight of 46 percent methanol-free aqueous formaldehyde solution which had been heated to 65° C. was added 18.3 parts by weight of 50 percent aqueous sodium hydroxide solution over a period of one hour. Throughout the addition, the formaldehyde solution was agitated vigorously, and its temperature was maintained at 65° C. The reaction mixture was then cooled at the rate of 7°–9° C. per hour to 25° C. The reaction mixture was agitated during the cooling period and then at 20°–25° C. for 8 hours.

The solid polymer that precipitated was isolated, washed with water until the pH of the wash water was 6.0, and then dried at 40° under vacuum. The product had an average molecular weight of 4100 and contained 0.02 percent by weight of water.

*Example IV*

To 1492 parts by weight of 46 percent methanol-free aqueous formaldehyde solution at room temperature was added 18.3 parts by weight of 50 percent aqueous sodium hydroxide solution. The reaction mixture was heated to 65° C. and then cooled at the rate of 7°–9° C. per hour to 25° C. The reaction mixture was agitated vigorously throughout the heating and cooling periods and then at 20°–25° C. for 8 hours.

The solid polymer that precipitated was isolated, washed with water until the pH of the wash water was 6.0, and then dried at 40° C. under vacuum. The product contained less than 0.02 percent by weight of water.

*Example V*

To 846 parts by weight of 37.8 percent methanol-free aqueous formaldehyde solution which had been heated to 60° C. was added 8.6 parts by weight of 50 percent aqueous sodium hydroxide solution over a 30-minute period. Throughout the addition, the formaldehyde solution was agitated vigorously, and its temperature was maintained at 60° C. The reaction mixture was then cooled at the rate of 6°–7° C. per hour to 20° C. The reaction mixture was agitated during the cooling period and then at 20° C. for 18 hours.

The solid polymer that precipitated was isolated, washed with water until the pH of the wash water was 6.0, and then dried at 40° C. under vacuum. There was obtained 182 parts by weight (42.3 percent conversion) of polyoxymethylene glycol which contained less than 0.02 percent by weight of water.

Although the foregoing examples illustrate the preparation of low molecular weight polyoxymethylene glycols using sodium hydroxide as the alkali, similar results may be obtained when other strongly alkaline compounds are used, such as the alkali metal and alkaline earth metal hydroxides, oxides, and carbonates.

We claim:
1. The process for producing a low molecular weight polyoxymethylene glycol suitable for depolymerization to gaseous monomeric formaldehyde which comprises (i) preparing an aqueous solution containing from about 30 to about 60 percent by weight of formaldehyde and from about 0.001 to about 0.05 mole of alkali per mole of formaldehyde, (ii) adjusting the temperature of the aqueous alkaline solution to a temperature in excess of the precipitation temperature of paraformaldehyde, (iii) slowly cooling the adjusted solution at a rate of about 3° C. to about 15° C. per hour to a temperature in the range between 20° C. and 30° C., thereby selectively crystallizing a low molecular weight polyoxymethylene glycol containing not more than 0.05 percent by weight of water, and (iv) drying the resultant crystallized polyoxymethylene glycol under vacuum.

2. The process for producing a low molecular weight polyoxymethylene glycol suitable for depolymerization to gaseous monomeric formaldehyde which comprises (i) preparing an aqueous solution containing from about 30 to about 60 percent by weight of formaldehyde and from about 0.005 to about 0.02 mole of alkali per mole of formaldehyde, (ii) adjusting the temperature of the aqueous alkaline solution to a temperature in the range from about 50° C. to about 100° C., (iii) slowly cooling the adjusted solution at a rate of about 6° C. to about 10° C. per hour to a temperature in the range between 20° and 30° C., thereby selectively crystallizing a low molecular weight polyoxymethylene glycol containing not more than 0.05 percent by weight of water, and (iv) drying the resultant crystallized polyoxymethylene glycol under vacuum.

3. The process for producing a low molecular weight polyoxymethylene glycol suitable for depolymerization to gaseous monomeric formaldehyde which comprises (i) preparing an aqueous solution containing from about 30 to about 60 percent by weight of formaldehyde and from about 0.005 to about 0.02 mole per mole of formaldehyde of an alkali selected from the group consisting of alkali metal and alkaline earth metal hydroxides, oxides, and carbonates, (ii) adjusting the temperature of the aqueous alkaline solution to a temperature in the range between about 50° C. and about 100° C., (iii) slowly cooling the adjusted solution at a rate of about 6° C. to about 10° C. per hour to a temperature in the range between 20° C. and 30° C., thereby selectively crystallizing a low molecular weight polyoxymethylene glycol containing not more than 0.05 percent by weight of water, and (iv) drying the resultant crystallized polyoxymethylene glycol under vacuum.

4. The process for producing a low molecular weight polyoxymethylene glycol suitable for depolymerization to gaseous monomeric formaldehyde which comprises (i) preparing an aqueous solution containing from about 45 to about 50 percent by weight of formaldehyde and from about 0.005 to about 0.02 mole of sodium hydroxide per mole of formaldehyde, (ii) adjusting the temperature of the aqueous alkaline solution to a temperature in the range between about 50° C. and about 100° C., (iii) slowly cooling the adjusted solution at a rate of about 6° C. to about 10° C. per hour to a temperature in the range between 20° C. and 30° C., thereby selectively crystallizing a low molecular weight polyoxymethylene glycol containing not more than 0.05 percent by weight of water, and (iv) drying the resultant crystallized polyoxymethylene glycol under vacuum.

5. The process for producing a low molecular weight polyoxymethylene glycol suitable for depolymerization to gaseous monomeric formaldehyde which comprises (i) preparing an aqueous solution containing from about 45 to about 50 percent by weight of formaldehyde and from about 0.005 to about 0.02 mole of sodium hydroxide per mole of formaldehyde, (ii) adjusting the temperature of the aqueous alkaline solution to a temperature in the range between about 50° C. and about 100° C., (iii) slowly cooling the adjusted solution at a rate of about 6° C. to about 10° C. per hour to a temperature in the range between 20° C. and 30° C., (iv) maintaining the cooled solution at a temperature in the range between 20° C. and 30° C. for a period of from 4 to 24 hours, thereby selectively crystallizing a low molecular weight polyoxymethylene glycol containing not more than 0.05 percent by weight of water, (v) recovering the crystallized polyoxymethylene glycol from the resultant mixture, and (vi) drying the crystallized polyoxymethylene glycol under vacuum.

References Cited by the Examiner

UNITED STATES PATENTS 2,092,422  9/1937  Naujoks _____ 260—615.5

FOREIGN PATENTS 888,559  1/1962  Great Britain.

OTHER REFERENCES

Staudinger et al.: Berichte der Deutschen Chemischen Gesellschaft, vol. 64 (1931), pages 398–405.

Walker: Formaldehyde (1953), pages 116, 129.

LEON ZITVER, *Primary Examiner.*

B. HELFIN, H. T. MARS, *Assistant Examiners.*